United States Patent
Häfner et al.

(10) Patent No.: US 9,473,014 B2
(45) Date of Patent: Oct. 18, 2016

(54) MECHANICAL BYPASS SWITCH DEVICE, CONVERTER ARM AND POWER CONVERTER

(71) Applicant: ABB Schweiz AG, Baden (CH)

(72) Inventors: Jürgen Häfner, Ludvika (SE); Christer Sjöberg, Ludvika (SE); Wim Van-Der-Merwe, Baden-Dättwil (CH)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 14/780,410

(22) PCT Filed: Apr. 18, 2013

(86) PCT No.: PCT/EP2013/058100
§ 371 (c)(1),
(2) Date: Sep. 25, 2015

(87) PCT Pub. No.: WO2014/169958
PCT Pub. Date: Oct. 23, 2014

(65) Prior Publication Data
US 2016/0056710 A1    Feb. 25, 2016

(51) Int. Cl.
*H02M 1/32* (2007.01)
*H02M 7/5387* (2007.01)
*H02M 7/483* (2007.01)

(52) U.S. Cl.
CPC ............ *H02M 1/32* (2013.01); *H02M 7/5387* (2013.01); *H02M 2007/4835* (2013.01)

(58) Field of Classification Search
CPC ...... H02M 1/32; H02M 7/125; H02H 7/062; H02H 7/12; H02H 7/125; H02H 7/1252; H02H 7/1255

USPC ............ 363/50, 52, 53, 81, 84, 125
See application file for complete search history.

(56) References Cited

U.S. PATENT DOCUMENTS

| | | | |
|---|---|---|---|
| 5,461,300 A * | 10/1995 | Kappenman | G05F 5/00 323/215 |
| 2005/0012395 A1 * | 1/2005 | Eckroad | H02J 3/16 307/44 |
| 2006/0044846 A1 * | 3/2006 | Hjort | H02J 9/062 363/34 |
| 2011/0235221 A1 | 9/2011 | Vögeli | |
| 2011/0267852 A1 | 11/2011 | Asplund | |
| 2012/0152702 A1 | 6/2012 | Gentsch | |

(Continued)

FOREIGN PATENT DOCUMENTS

| | | |
|---|---|---|
| EP | 2 369 725 A1 | 9/2011 |
| WO | WO 2010/145688 A1 | 12/2010 |

(Continued)

*Primary Examiner* — Adolf Berhane
(74) *Attorney, Agent, or Firm* — Birch, Stewart, Kolasch & Birch, LLP (57) ABSTRACT

It is provided a mechanical bypass switch device arranged to bypass a converter cell in a power converter. The mechanical bypass switch device includes: a mechanical switch; a mechanical switch actuator arranged to make the mechanical switch conduct when supplied with an electric signal; a first control input; and a second control input. The mechanical bypass switch device is arranged such that a control signal, provided on either one of the first control input and the second control input or on both of the first control input and the second control input, causes the mechanical switch to conduct. A corresponding converter arm and bypass converter are also presented.

16 Claims, 5 Drawing Sheets

(56) References Cited

U.S. PATENT DOCUMENTS

| | | | | |
|---|---|---|---|---|
| 2013/0002024 A1* | 1/2013 | Beg | ................ | H02J 9/061 |
| | | | | 307/64 |
| 2013/0026841 A1* | 1/2013 | Hosini | ................ | H02J 3/1842 |
| | | | | 307/77 |
| 2013/0208521 A1* | 8/2013 | Trainer | ................ | H02J 3/36 |
| | | | | 363/126 |
| 2014/0097804 A1* | 4/2014 | Hasler | ................ | H02J 3/18 |
| | | | | 320/166 |
| 2015/0108091 A1* | 4/2015 | Oberg | ................ | H01H 39/004 |
| | | | | 218/65 |
| 2015/0162738 A1* | 6/2015 | Wikstrom | ................ | H02H 3/023 |
| | | | | 361/101 |

FOREIGN PATENT DOCUMENTS

| | | |
|---|---|---|
| WO | WO 2011/113492 A1 | 9/2011 |
| WO | WO 2012/167835 A1 | 12/2012 |
| WO | WO 2013/017145 A1 | 2/2013 |

* cited by examiner

MECHANICAL BYPASS SWITCH DEVICE, CONVERTER ARM AND POWER CONVERTER

TECHNICAL FIELD

The invention relates to a mechanical bypass switch device, converter arm and bypass converter for bypassing a converter cell.

BACKGROUND

In HVDC (High Voltage Direct Current) applications, high voltage power converters are used for converting between the AC (Alternating Current) grid and DC (Direct Current). The conversion often occurs using a large number of converter cells. Converter cells are also used in other applications, such as medium voltage power converters.

US 2011/0267852 presents a voltage source converter having a series connection of switching assemblies, in which each switching assembly has an electrically conducting plate member carrying a plurality of semiconductor chips each having at least a semiconductor device of turn-off type and a free-wheeling diode connected in parallel therewith. Said chips are connected in parallel with each other by each being connected by at least one individual conductor member to a said plate member of an adjacent switching assembly of said series connection. Each switching assembly has a mechanical switch configured to be open under normal operation of the switching assembly and configured to enable connection of said plate member of the switching assembly to the plate member of an adjacent switching assembly for bypassing said semiconductor chips of the switching assembly to which the mechanical switch belongs in the case of occurrence of a short circuit current through a semiconductor chip of the switching assembly.

However, the solution of US 2011/0267852 may still be vulnerable to failure. Any improvement, no matter how small, in availability and reliability of power conversion applications in general, and mechanical bypass switches in particular, are of great benefit.

SUMMARY

It is an object to improve reliability of a mechanical bypass switch device arranged to bypass a converter cell in a power converter.

According to a first aspect, it is provided a mechanical bypass switch device arranged to bypass a converter cell in a power converter. The mechanical bypass switch device comprises: a mechanical switch; a mechanical switch actuator arranged to make the mechanical switch conduct when supplied with an electric signal; a first control input; and a second control input. The mechanical bypass switch device is arranged such that a control signal, provided on either one of the first control input and the second control input or on both of the first control input and the second control input, causes the mechanical switch to conduct. By providing two control inputs, a degree of reliability is achieved which is not shown in the prior art. This is of great importance, since any uncontrolled failure can result in down time which seriously impacts availability of crucial electric network elements. There may be more control inputs than the two mentioned here for even greater redundancy.

The mechanical bypass switch device may further comprise: a first control switch whose electrical conductive state is controlled using the first control input; a second control switch whose electrical conductive state is controlled using the second control input; and a control switch combination comprising the first control switch connected in parallel with the second control switch. In such a case, the control switch combination is serially connected with the mechanical switch actuator. This implements the independent control inputs to control the mechanical switch actuator.

The mechanical switch actuator may comprise a pyrotechnic actuator.

The mechanical bypass switch device may further comprise a monitoring device for detecting whether the mechanical switch is conducting. In this way, other measures can be effected if the mechanical switch has failed to assume a conducting state.

The monitoring device may comprise two signal outputs for supplying a signal indicating whether the mechanical switch is conducting to two separate devices. This achieves a greater redundancy for even better reliability of the mechanical bypass switch device. There may be more signal outputs than the two mentioned here for even greater redundancy.

The mechanical switch may comprise a stationary part and a movable part, wherein the movable part is attached to an optical fibre which is arranged to break when the movable part moves to make the mechanical switch conduct.

The mechanical switch may comprise a stationary part and a movable part, wherein the movable part comprises a reflective surface which is arranged to reflect light when the movable part is in a position to make the mechanical switch conduct.

Each one of the first control input and the second control input may be fibre optic inputs. With fibre optic inputs there can be a significant voltage difference between the first and second control inputs and the device providing inputs to these control inputs. This allows several mechanical bypass switch devices to be controlled by a single (with optional redundancy) central control unit, even if the mechanical bypass switch devices are at significantly different voltage levels.

The mechanical bypass switch device may further comprise an energy storage device for powering the mechanical switch actuator. By including an energy storage device in the mechanical bypass switch device, a greater independence in powering the operation of the mechanical bypass switch device in general, and the mechanical switch actuator in particular, is achieved.

The mechanical bypass switch device may further comprise two energy storage devices for powering the mechanical switch actuator. By having two energy storage devices, a redundancy in energy provision is achieved, allowing the mechanical bypass switch device to still operate even if one of the energy storage devices fails.

Any energy storage device may be arranged to be charged from two separate power sources. This provides an even greater redundancy, since it allows for a power source to fail without affecting the charging of the energy storage device and thus operation of the mechanical bypass switch device.

One power source may be the converter cell and one power source may be a local control unit, also being arranged to control the operation of the converter cell. These are both power sources which can be in the proximity of the mechanical bypass switch device.

According to a second aspect, it is provided a converter arm comprising a plurality of serially connected converter cells, wherein each converter cell comprises an energy storage element, at least two switching elements and the mechanical bypass switch device according to the first aspect.

Each converter cell may be associated with a respective local control unit and each local control unit may be connected to one of the first control input and second control input of its associated converter cell and a converter cell neighbouring the associated converter cell.

The local control units may be pairwise connected to their own and each other's respectively associated converter cell.

Each one of the converter cells may be a half bridge cell or a full bridge cell. Alternatively, other converter cell structures can be used, e.g. based on other bridge structures or resonant structures.

According to a third aspect, it is provided a power converter comprising at least one converter arm according to any one of claims 10 to 12.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
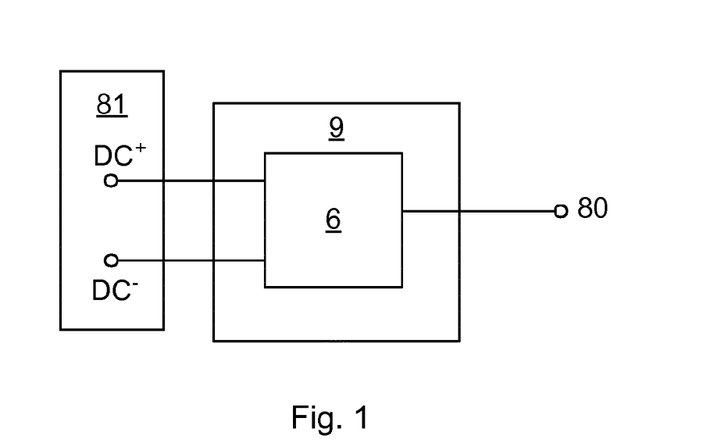
FIG. 1 is a schematic diagram of a power converter for converting between DC and AC.

FIG. 1 is a schematic diagram of a power converter 9 for converting between DC and AC. The power converter 9 converts power in either direction between a DC connection 81 and an AC connection 80. The DC connection 81 comprises a positive terminal DC+ and a negative terminal DC−. The AC connection 80 comprises a phase terminal AC and an AC ground terminal (not shown). Power can flow from DC to AC or vice versa. The power converter 9 comprises a power converter assembly 6 which performs the actual power conversion. This division between the power converter 9 and the power converter assembly 6 does not need to be represented by physical objects, whereby the power converter 9 and the power converter assembly 6 can in practice be the same device.

Figure 2:
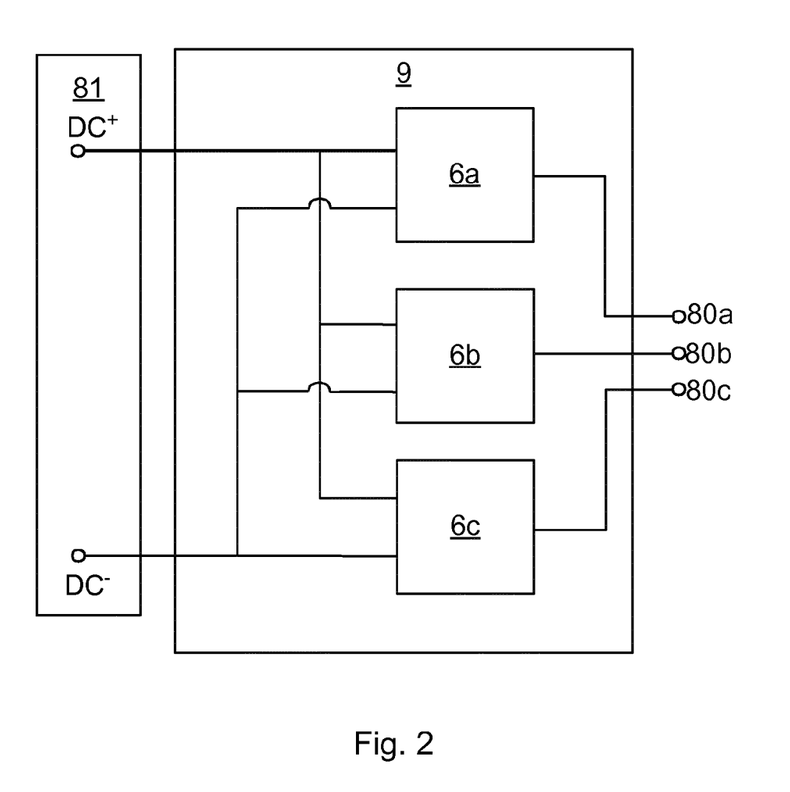
FIG. 2 is a schematic diagram of a three phase power converter for converting between DC and AC.

FIG. 2 is a schematic diagram of a three phase power converter 9 for converting between DC and AC. The three phase power converter 9 here comprises three power converter assemblies 6a-c. In this way, the AC connection here comprises three phase terminals 80a, 80b and 80c to be able to provide a three phase connection, e.g. to an AC grid, an AC power source or an AC power load. Optionally, an AC ground terminal is also provided (not shown). A corresponding multiphase power converter can be achieved for other than three phases by connecting the same number of power converter assemblies as there are phases. In this way, multiphase power converters for any suitable number of phases, such as two, four, five, six, etc., phases can be provided.

Figure 3:
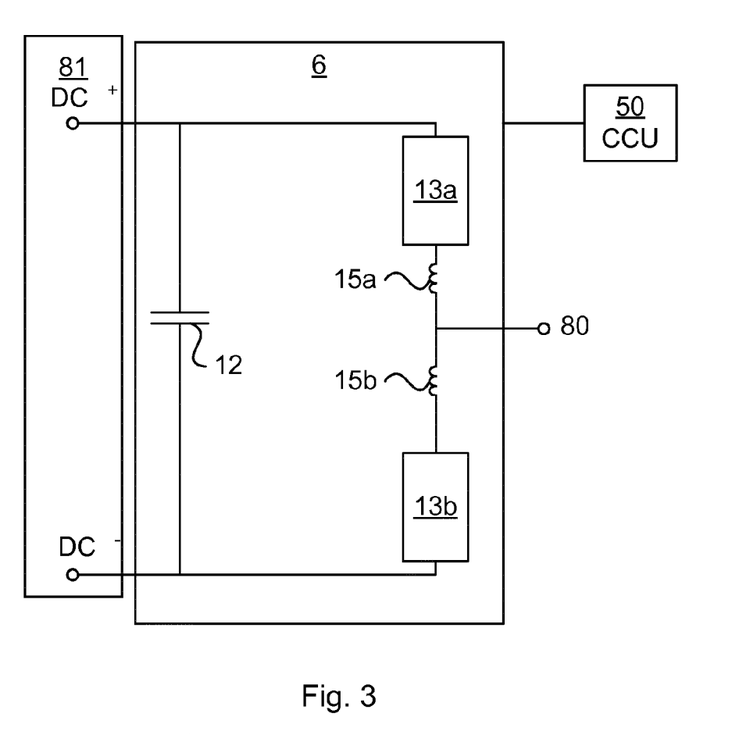
FIG. 3 is a schematic diagram illustrating an embodiment of the power converter assemblies, of FIGS. 1 and 2, represented by a single power converter assembly.

FIG. 3 is a schematic diagram illustrating an embodiment of the power converter assemblies 6, 6a-c of FIGS. 1 and 2, represented here by a single power converter assembly 6. The power converter assembly 6 comprises an upper converter arm 13a and a lower converter arm 13b, connected serially between the positive and negative terminals DC+, DC− of the DC connection 81. Positive and negative are here to be interpreted as relative terms and not absolute. For example, the positive terminal or the negative terminal could be at ground potential.

The AC connection 80 is provided between the upper converter arm 13a and the lower converter arm 13b. Optionally, one or two (or more) smoothing inductors 15a-b are provided between the converter arms 13a-b.

A DC side capacitor 12 is arranged between the positive and negative DC terminals, DC+ and DC−, to allow an AC current to circulate with minimal effect. Optionally, when a multiphase power converter 9 such as the one shown in FIG. 2 is used, the DC side capacitor 12 can be omitted, since an AC current can circulate between the DC sides of the various phases.

A central control unit (CCU) 50 is connected to the power converter assembly 6 to control its operation. This includes the control of the upper converter arm 13a and the lower converter arm 13b to perform the conversion between DC and AC by controlling converter cells of the upper and lower converter arms 13a-b.

The embodiment shown of the power converter assembly of FIG. 3 is only an example and the principles presented herein can be applied to any type of suitable power converter assemblies using converter cells, e.g. included in converter arms. For example, power converter assemblies where converter cells for the various phases are connected serially between the DC terminals can be used, or shunt and series hybrid converters (comprising both converter cells and switches separate from converter cells).

Figure 4A:
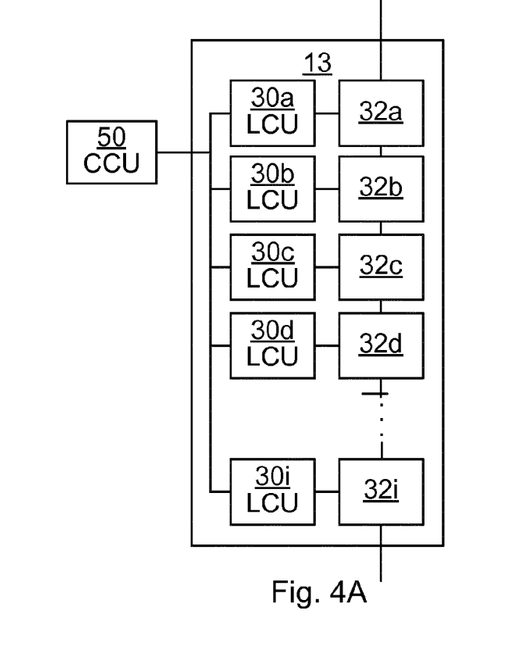
FIG. 4A-B are schematic diagrams illustrating an embodiment the upper converter arm and the lower converter arm of FIG. 3, represented by a single converter arm.
Figure 4B:
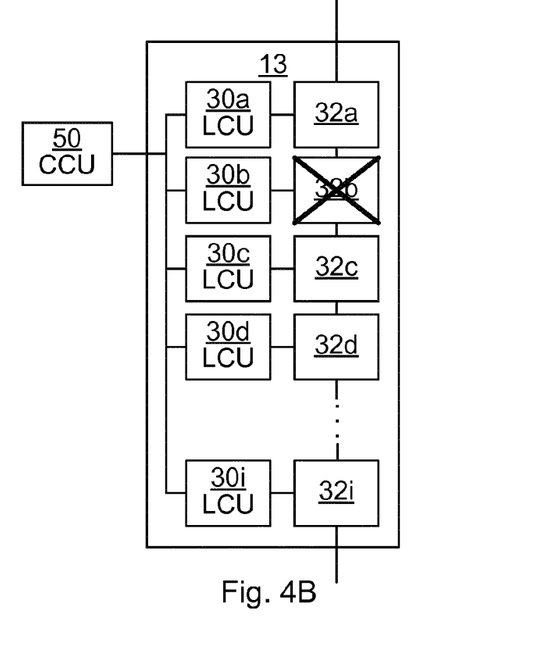

FIG. 4A-B are schematic diagrams illustrating the upper converter arm 13a and the lower converter arm 13b, here represented by a single converter arm 13.

The converter arm 13 comprises a number of converter cells 32a-i. Each converter cell is controlled by a local control unit (LCU) 30a-i, which in turn is controlled by the central control unit 50.

The central control unit 50 controls the local control units 30a-i to perform switching to supply an alternating current to the AC output (AC of FIG. 3) e.g. using pulse width modulation (PWM).

The converter cells 32a-i are serially connected, allowing them to be individually controlled to achieve a finer granularity in the conversion, e.g. to achieve a more sinusoidal (or square, saw tooth shaped, etc.) power conversion. Also, by controlling the serially connected converter cells 32a-i in this way, the switching frequency of each converter cell can be relatively low, which results in low switching losses when compared to higher switching frequencies. Furthermore, by connecting the converter cells serially, voltage rating is increased. Alternatively or additionally, converter cells can be connected in parallel (not shown) to increase current rating.

The converter arm 13 can comprise any suitable number of converter cells, including one, two, three or more. In one embodiment, the number of converter cells in each converter arm 13 is in the range from 30 to 1000 converter cells.

In the scenario shown in FIG. 4A, all converter cells 32a-i are operational. In the scenario of FIG. 4B, however, the second converter cell 32b has failed.

Nevertheless, the converter arm 13 can still work as desired if the failed converter cell 32b is set to conduct in a bypass mode. In bypass mode, the converter cell in question is short circuited and continuously conducts. In other words, regardless of the signal from the central control unit 50, the failed converter cell 32b will conduct. As long as there is some over-dimensioning in this configuration, i.e. a surplus of converter cells 32a-i, the remaining, operational converter cells operate and provide the desired function of the converter arm until the failed converter cell 32b is replaced or repaired.

Figure 5A:
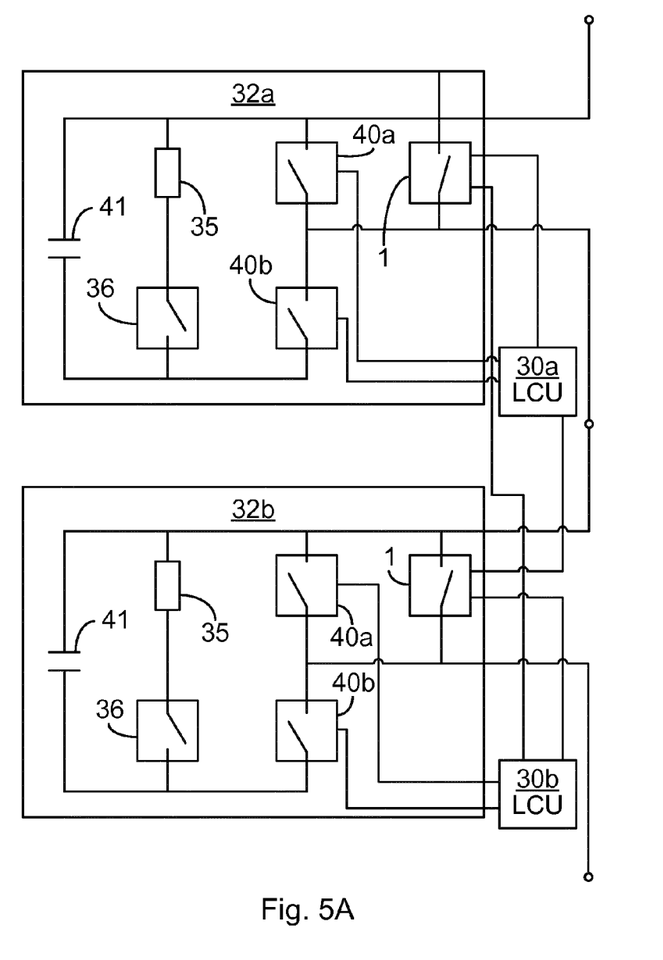
FIG. 5A is a schematic diagram illustrating two converter cells and their respectively associated local control units according to one embodiment.

FIG. 5A is a schematic diagram illustrating two converter cells 32a-b and their respectively associated local control units 30a-b according to one embodiment. A first converter cell 32a is associated with a first local control unit 30a and a second converter cell 32b is associated with a second local control unit 30b.

The first converter cell 32a is here a half bridge cell. The first converter cell 32a comprises a leg of two serially connected switching elements 40a-b. Each one of the switching elements 40a-b can for example be implemented using an insulated gate bipolar transistor (IGBT), Integrated Gate-Commutated Thyristor (IGCT), a Gate Turn-Off thyristor (GTO), or any other suitable semiconductor component. Optionally, there is an antiparallel diode connected across each switching element 40a-b (not shown). An energy storage element 41 is also provided in parallel with the leg of switching elements 40a-b. The energy storage element 41 can e.g. be a capacitor, supercapacitor, inductor, battery, etc. The voltage synthesised by the first converter cell 32a can thus either be zero or the voltage of the energy storage element 41, which is normally controlled by the first local control unit 30a.

Optionally, there is also a leg in parallel with the energy storage element 41 comprising a discharge switch 36 serially connected with a discharge resistor 35 to reduce a current through the discharge switch when it is set in conducting mode. The discharge switch 36 is used when the energy storage element needs to be discharged, e.g. for maintenance or repairs.

The first converter cell also comprises a mechanical bypass switch device 1 directly connected between the terminals of the first converter cell 32a. Normally, the mechanical bypass switch device 1 is in a blocking mode, whereby the voltage of the first converter cell can be controlled by the first local control unit 32a. However, when the mechanical bypass switch device 1 is in a conducive mode the mechanical bypass switch device 1 short-circuits the first converter cell 32a. In other words, the mechanical bypass switch device 1 is used to implement the bypass mode described above. The mechanical bypass switch device 1 has two control inputs, whereby it can be controlled by both the first local control unit 30a and the second local control unit 30b. In this way, there is redundancy in the control of the mechanical bypass switch device 1. This is of great benefit, since if the first converter cell 32a fails and the bypass mode could not be effected due to the first local control unit 30a being defective, the operation of the first converter cell 32a may be undefined. In such a situation, the whole power converter 9 may need to be shut down which can lead to power failure and/or great costs. However, with the double command presented here, the second local control unit 30b can control the mechanical bypass switch device 1 to set the first converter cell 32a in bypass mode.

The second converter cell 32b here is of a structure which is identical to the first converter cell 32a. The local control units 30a-b are pairwise connected to their own and each other's respectively associated converter cell. Other control units and converter cells (not shown) of the converter arm can also be connected in this way. This reduces the risk of failures uncontrollably propagating through the whole converter arm. Moreover, such a structure reduces the length of the connections between the local control units and the converter cells, which keeps the electro-magnetic interference (EMI) down. In high voltage applications, EMI is often significant in magnitude.

In another embodiment (not shown), the control units are daisy chained with all the converter cells, such that a local control unit forms a bridge between two neighbouring converter cells. Alternatively, the control units and converter cells can be connected in groups of three, four or more.

Figure 5B:
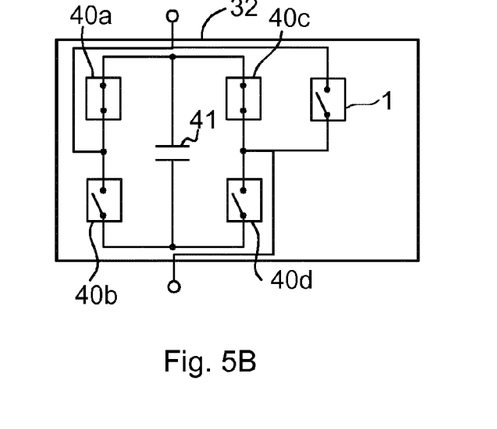
FIG. 5B is a schematic diagram illustrating a converter cell according to one embodiment.

FIG. 5B illustrates a converter cell 32 implementing a full bridge structure. The converter cell can be any one of the converter cells 32a-i of FIGS. 4A-B and can replace the half bridge converter cells 32A-B shown in FIG. 5A. The converter cell 32 here comprises four switching elements 40a-d, e.g. IGBTs, IGCTs, GTOs, etc. Optionally, there is an antiparallel diode connected across each switching element 40a-d (not shown). An energy storage element 41 is also provided in parallel across a first leg of two switching elements 40a-b and a second leg of two switching elements 40c-d. The converter cell 32 also comprises a mechanical bypass switch device 1 directly connected between the terminals of the converter cell 32 and functions in the same way as explained above with reference to FIG. 5A. There is also a local control unit (not shown) which functions in the same way as explained above with reference to FIG. 5A.

Compared to the half bridge structure of the converter cells shown in of FIG. 5A, the full bridge structure allows the synthesis of a voltage capable of assuming both signs, whereby the voltage of the converter cell can either be zero, the voltage of the energy storage element 41, or a reversed voltage of the energy storage element 41.

Alternatively, other converter cell structures (not shown) can be used for the converter cell 32, e.g. based on other bridge structures or resonant structures. Also in such structures, the mechanical bypass switch device 1 can be used to set the converter cell in bypass mode.

Figure 6:
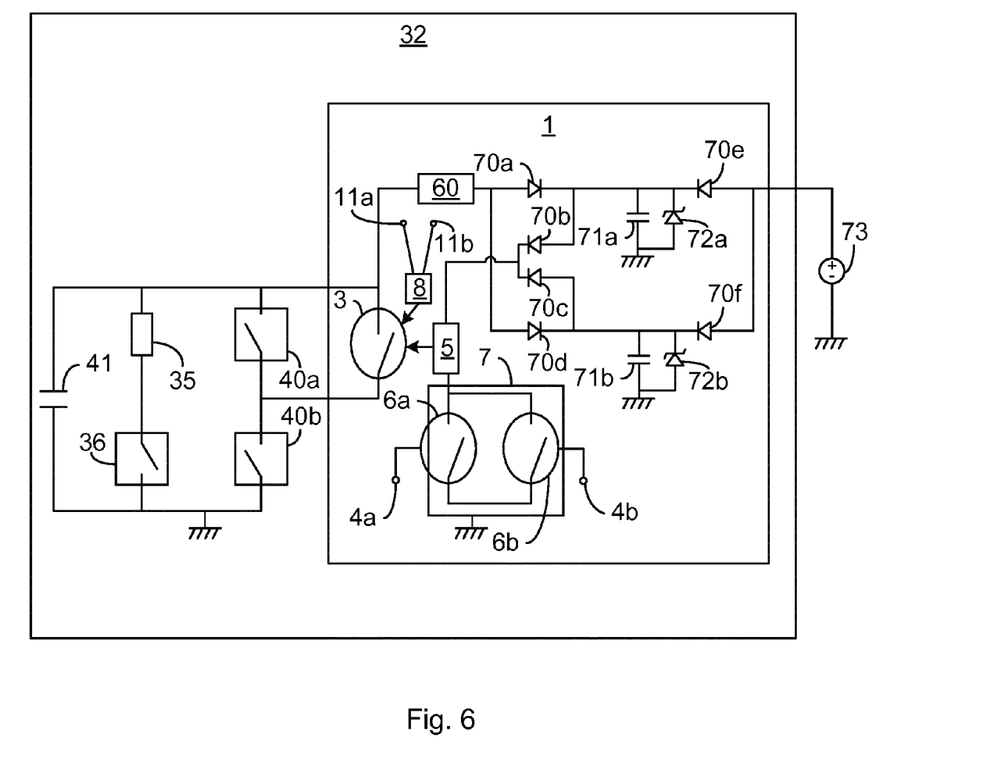
FIG. 6 is a schematic diagram illustrating a converter cell of the two converter cells of FIGS. 5A-B in more detail.

FIG. 6 is a schematic diagram illustrating a converter cell 32 of the two converter cells of FIG. 5A in more detail. In particular, the mechanical bypass switch device 1 according to an example embodiment is shown in more detail. The mechanical bypass switch device 1 of FIG. 5B can be implemented in the same way as depicted in FIG. 6 and described below with reference to FIG. 6.

The mechanical bypass switch device 1 comprises a mechanical switch 3 which can be controlled by a mechanical switch actuator 5 to make the mechanical switch 3 conduct when the mechanical switch actuator 5 is supplied with an electric signal. The electrical signal is a signal with predetermined characteristics, e.g. voltage over a threshold level and/or a current over a threshold level. In one embodiment, the mechanical switch actuator 5 can comprise a pyrotechnic actuator to make the mechanical switch 3 conduct.

The mechanical bypass switch device 1 further comprises a first control input 4*a* and a second control input 4*b* to be connected with two respective local control units as explained with reference to FIG. 5 above. In this way, a control signal provided on either one or both of the first control input 4*a* and the second control input 4*b* causes an electric signal to be provided to the mechanical switch actuator 5 which causes the mechanical switch 3 to conduct. In other words, a control signal provided only on the first control input 4*a* causes the mechanical switch to conduct, a control signal provided only on the second control input 4*b* causes the mechanical switch to conduct, and a control signal provided on both the first control input 4*a* and the second control input 4*b* causes the mechanical switch 3 to conduct. Each one of the first control input 4*a* and the second control input 4*b* can be fibre optic inputs or galvanic inputs. With fibre optic inputs, in contrast to galvanic connections, it inherently allows there to be a significant voltage difference between the first and second control inputs 4*a*-*b* and the device providing inputs to these control inputs 4*a*-*b*, without any need for galvanic insulation.

In this embodiment, there is a first control switch 6*a* whose electrical conductive state is controlled using the first control input 4*a* and a second control switch 6*b* whose electrical conductive state is controlled using the second control input 4*b*. A control switch combination 7 comprises the first control switch 6*a* connected in parallel with the second control switch 6*b* and the control switch combination 7 is serially connected with the mechanical switch actuator 5. The control switches 6*a*-*b* can be any suitable electrically controlled switches, such as a transistor or thyristor, optically or galvanically controlled.

A high ohmic resistor 60 is provided between the positive voltage side of the converter cell 32 and two respective energy storage devices 71*a*-*b*, charging the two energy storage devices 71*a*-*b* via two respective diodes 70*a*-*b*. The energy storage devices 71*a*-*b* can e.g. be implemented using capacitors, supercapacitors, inductors, batteries, etc. Moreover, a separate power supply 73 provides power to the mechanical bypass switch device 1 via two respective diodes 70*e*-*f*. The separate power supply 73 can e.g. be part of the local control unit. Two independent Zener diodes 72*a*-*b* are used to regulate the voltage level charging the two respective energy storage devices 71*a*-*b*. Each one of the energy storage devices 71*a*-*b* are then connected via two respective diodes 70*b*-*c* to the mechanical switch actuator 5.

In this way, power supply redundancy is achieved in two separate ways. Firstly, there are two separate power supplies: one is the converter cell 32 charging the energy storage devices 71*a*-*b* and one is the separate power supply 73. Secondly, there are two separate sets of control circuitry for providing power from the two power supplies to the mechanical switch actuator 5. This reduces any risk of failure due to a failure of a single or even multiple components.

Moreover, the mechanical bypass switch device 1 optionally comprises a monitoring device 8 for detecting whether the mechanical switch 3 is conducting or not. This can be of great benefit, since it may not be sufficient to simply monitor that the converter cell 32 is in bypass mode. The converter cell could be in short circuit mode also if the first switching element 40*a* has failed in a short circuit mode. However, such a scenario is dependent on the first switching element 40*a* continuing to be in a short circuit mode, and is not reliable. Hence, such a scenario should not be trusted as a stable short circuit.

The monitoring device 8 can also be configured for redundant use, by comprising two signal outputs 11*a*-*b* for supplying a signal indicating whether the mechanical switch 3 is conducting to two separate devices, such as the two connected local control units described with reference to FIG. 5 above.

While the mechanical bypass switch device 1 can be provided to bypass any type of converter cell. For example the mechanical bypass switch device 1 can be provided to bypass any type of half bridge cell (and not only the configuration shown in FIG. 6), full bridge cell, other bridge structures or resonant structures.

Figure 7A:
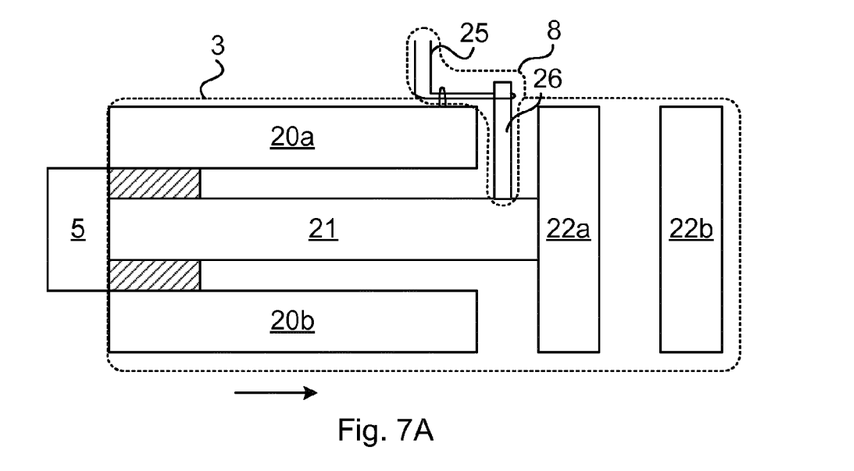
FIGS. 7A-C are schematic diagrams illustrating a mechanical switch with various embodiments of the monitoring device of FIG. 6.
Figure 7B:
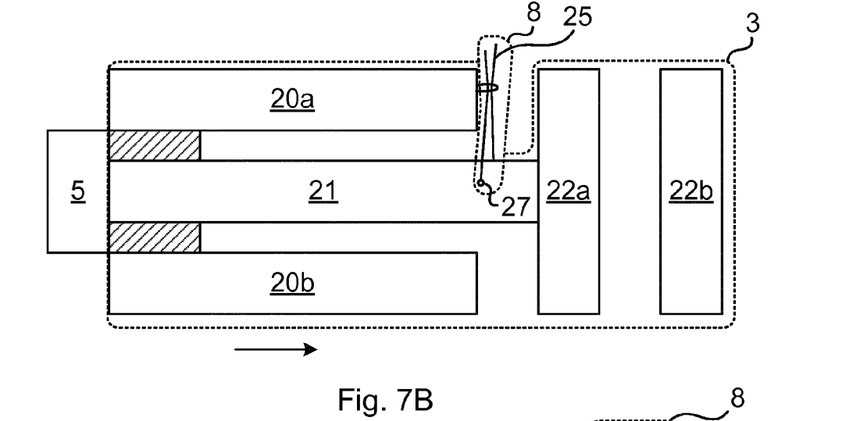
Figure 7C:
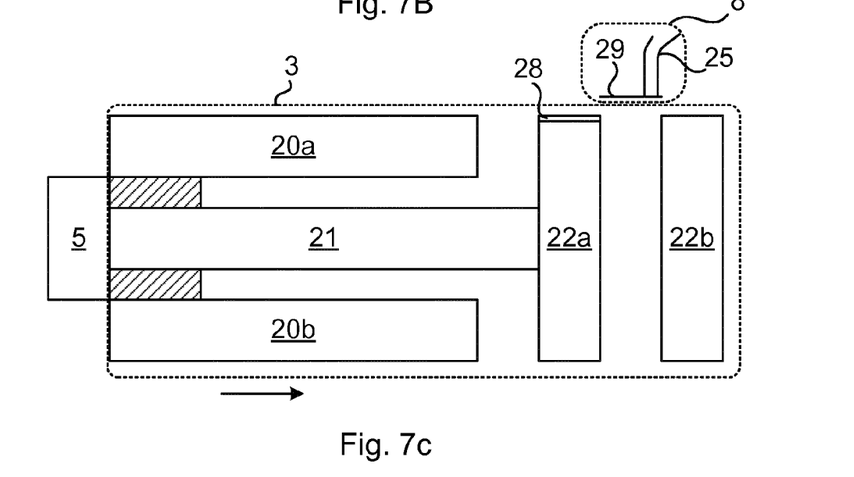

FIGS. 7A-C are schematic diagrams illustrating a mechanical switch with various embodiments of the monitoring device 8 of FIG. 6. The mechanical switch 3 comprises a stationary part 20*a*-*b* and a movable part 21. Attached to the movable part 21, there is a first contact piece 22*a*. When the mechanical switch actuator 5 is activated, it makes the movable part 21 move in the direction of the arrow, whereby the first contact piece 22*a* makes contact with 22*b*. This makes the mechanical switch 3 conduct.

In the embodiment shown in FIG. 7A, the movable part 21 is attached to an optical fibre 25 which is arranged to break when the movable part 21 moves to make the mechanical switch 3 conduct. When the optical fibre 25 breaks, an optical signal through the optical fibre 25 is interrupted, and this change is propagated to the two signal outputs (11*a*-*b* of FIG. 6). Optionally, there are two optical fibres individually connected to two respective signal outputs. In this way, it is sufficient that one of the two fibres break to indicate that the mechanical switch 3 is in a conducting state.

The optical fibre 25 is here being attached to the movable part 21 by the optical fibre 25 being looped around a protruding section 26 which protrudes essentially perpendicularly relative to the direction of movement of the movable part 21.

In the embodiment shown in FIG. 7B, as in the embodiment shown in FIG. 7A, the movable part 21 is also attached to the optical fibre 25, whereby the optical fibre 25 breaks when the movable part 21 moves to make the mechanical switch 3 conduct. When the optical fibre 25 breaks, this signal is propagated to the two signal outputs (11*a*-*b* of FIG. 6). Here however, the optical fibre 25 is attached to the movable part 21 by the optical fibre being looped through a hole 27 of the movable part 21.

In the embodiment shown in FIG. 7C, the movable part 21 comprises a reflective surface 28 which is arranged to reflect light when the movable part 21 is in a position to make the mechanical switch 3 conduct.

Embodiments presented herein can be applied to high voltage applications. Alternatively or additionally, embodiments presented herein can be applied to medium voltage applications or even low voltage applications.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mechanical bypass switch device arranged to be directly connected between the terminals of a first converter cell to bypass the first converter cell in a power converter, the mechanical switch device comprising:
   a mechanical switch;
   a mechanical switch actuator arranged to make the mechanical switch conduct when supplied with an electric signal;
   a first control input;
   a second control input;
   a first control switch whose electrical conductive state is controlled using the first control input;
   a second control switch whose electrical conductive state is controlled using the second control input; and
   a control switch combination comprising the first control switch connected in parallel with the second control switch;
   wherein the control switch combination is serially connected with the mechanical switch actuator, and
   wherein the mechanical bypass switch device is arranged such that a control signal, provided on either one of the first control input and the second control input or on both of the first control input and the second control input, causes the mechanical switch to conduct and such that the first control input is to be connected with a local control unit of the first converter cell and the second control input is to be connected with a local control unit of a second converter cell.

2. The mechanical bypass switch device according to claim 1, wherein the mechanical switch actuator comprises a pyrotechnic actuator.

3. The mechanical bypass switch device according to claim 1, further comprising a monitoring device for detecting whether the mechanical switch is conducting.

4. A mechanical bypass switch device arranged to be directly connected between the terminals of a first converter cell to bypass the first converter cell in a power converter, the mechanical switch device comprising:
   a mechanical switch;
   a mechanical switch actuator arranged to make the mechanical switch conduct when supplied with an electric signal;
   a first control input;
   a second control input; and
   a monitoring device for detecting whether the mechanical switch is conducting,
   wherein the mechanical bypass switch device is arranged such that a control signal, provided on either one of the first control input and the second control input or on both of the first control input and the second control input, causes the mechanical switch to conduct and such that the first control input is to be connected with a local control unit of the first converter cell and the second control input is to be connected with a local control unit of a second converter cell, and
   wherein the monitoring device comprises two signal outputs for supplying a signal indicating whether the mechanical switch is conducting to two separate devices.

5. A mechanical bypass switch device arranged to be directly connected between the terminals of a first converter cell to bypass the first converter cell in a power converter, the mechanical switch device comprising:
   a mechanical switch;
   a mechanical switch actuator arranged to make the mechanical switch conduct when supplied with an electric signal;
   a first control input;
   a second control input; and
   a monitoring device for detecting whether the mechanical switch is conducting,
   wherein the mechanical bypass switch device is arranged such that a control signal, provided on either one of the first control input and the second control input or on both of the first control input and the second control input, causes the mechanical switch to conduct and such that the first control input is to be connected with a local control unit of the first converter cell and the second control input is to be connected with a local control unit of a second converter cell, and
   wherein the mechanical switch comprises a stationary part and a movable part, wherein the movable part either is attached to an optical fibre which is arranged to break when the movable part moves to make the mechanical switch conduct, or comprises a reflective surface which is arranged to reflect light when the movable part is in a position to make the mechanical switch conduct.

6. The mechanical bypass switch device according to claim 1, wherein each one of the first control input and the second control input are fibre optic inputs.

7. The mechanical bypass switch device according to claim 1, further comprising an energy storage device for powering the mechanical switch actuator.

8. The mechanical bypass switch device according to claim 1, further comprising two energy storage devices.

9. The mechanical bypass switch device according to claim 7, wherein any energy storage device is arranged to be charged from two separate power sources.

10. The mechanical bypass switch device according to claim 9, wherein one power source is the converter cell and one power source is a local control unit, also being arranged to control the operation of the converter cell.

11. A converter arm comprising a plurality of serially connected converter cells, wherein each converter cell comprises an energy storage element, at least two switching elements and the mechanical bypass switch device according to claim 1.

12. The converter arm according to claim 11, wherein each converter cell is associated with a respective local control unit and wherein each local control unit is connected to one of the first control input and second control input of its associated converter cell and a converter cell neighbouring the associated converter cell.

13. The converter arm according to claim 12, wherein the local control units are pairwise connected to their own and each other's respectively associated converter cell.

14. The converter arm according to claim 11, wherein each one of the converter cells is a half bridge cell.

15. The converter arm according to claim 11, wherein each one of the converter cells is a full bridge cell.

16. A power converter comprising at least one converter arm according to claim 12.

* * * * *